United States Patent
Le Jouan

(10) Patent No.: US 10,089,723 B2
(45) Date of Patent: *Oct. 2, 2018

(54) SYSTEMS AND METHODS FOR MEDIA PRIVACY

(71) Applicant: Privowny, Inc., Palo Alto, CA (US)

(72) Inventor: Hervé Le Jouan, Saint-Cloud (FR)

(73) Assignee: Privowny, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,545

(22) Filed: Mar. 14, 2018

(65) Prior Publication Data

US 2018/0204308 A1    Jul. 19, 2018

Related U.S. Application Data

(63) Continuation of application No. 15/201,015, filed on Jul. 1, 2016.

(60) Provisional application No. 62/188,033, filed on Jul. 2, 2015.

(51) Int. Cl.
| | |
|---|---|
| *G06K 9/00* | (2006.01) |
| *G06T 5/00* | (2006.01) |
| *G06T 11/60* | (2006.01) |
| *G06F 17/30* | (2006.01) |

(52) U.S. Cl.
CPC .......... *G06T 5/002* (2013.01); *G06F 17/3028* (2013.01); *G06K 9/00221* (2013.01); *G06T 11/60* (2013.01); *G06K 2209/27* (2013.01)

(58) Field of Classification Search
None
See application file for complete search history.

(56) References Cited

U.S. PATENT DOCUMENTS

| 9,396,354 B1 | 7/2016 | Murphy |
| 2013/0121584 A1 | 5/2013 | Bourdev |
| 2013/0161381 A1 | 6/2013 | Roundtree |
| 2013/0305383 A1 | 11/2013 | Garralda |
| 2014/0341442 A1 | 11/2014 | Lewis |

(Continued)

OTHER PUBLICATIONS

International Application No. PCT/US2016/040863, International Search Report and Written Opinion dated Sep. 26, 2016.

*Primary Examiner* — Sumati Lefkowitz
*Assistant Examiner* — David Perlman
(74) *Attorney, Agent, or Firm* — Sheppard, Mullin, Richter & Hampton LLP

(57) ABSTRACT

A system comprises a picture and metadata captured by a content capture system; a recognizable characteristic datastore configured to store recognizable characteristics of different users; a module configured to identify a time and a location associated with the picture based on the metadata, and to identify one or more potential target systems within a predetermined range of the location at the time; a characteristic recognition module configured to retrieve the recognizable characteristics of one or more potential users associated with the potential target systems, and evaluate whether the picture includes one or more representations of at least one actual target user from the potential users based on the recognizable characteristics of the potential users; a distortion module configured to distort a feature of the representations of the least one actual target user in response to the determination; a communication module configured to communicate the distorted picture to a computer network.

18 Claims, 8 Drawing Sheets

(56) References Cited

U.S. PATENT DOCUMENTS

2015/0039616 A1     2/2015   Duggal
2016/0307042 A1    10/2016   Martin

SYSTEMS AND METHODS FOR MEDIA PRIVACY

CROSS-REFERENCE TO RELATED APPLICATIONS

The present application is a continuation of U.S. patent application Ser. No. 15/201,015 filed Jul. 1, 2016 and entitled "Systems and Methods for Media Privacy," which claims priority to U.S. Provisional Patent Application Ser. No. 62/188,033 filed Jul. 2, 2015 and entitled "Media Privacy," which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

Embodiments of the present inventions relate generally to the field of media. More specifically, embodiments of the present inventions relate to media privacy.

Description of Related Art

The Internet has provided platforms (e.g., Facebook, Instagram, etc.) for posting pictures and other media that are accessible by almost anyone, anywhere, which can raise a variety of privacy issues. Moreover, digital cameras are becoming more prevalent every day, and they are often included in mobile devices (e.g., smartphones, tablets, smartglasses, etc.), which can make it difficult for individuals to even be aware that their picture has been taken. Thus, for example, pictures may be taken of an individual and posted on a social media system without the individual ever have been made aware that their pictures was taken, let alone that it had been posted on the Internet.

SUMMARY

The Internet has provided platforms (e.g., Facebook, Instagram, etc.) for posting pictures and other media that are accessible by almost anyone, anywhere, which raises a variety of privacy issues. Moreover, digital cameras are becoming more prevalent every day, and they are often included in mobile devices (e.g., smartphones, tablets, smartglasses, etc.), which can make it difficult for individuals to even be aware that their picture has been taken. Thus, for example, pictures may be taken of an individual and posted on a social media system without the individual ever have been made aware that their pictures was taken, let alone that it had been posted on the Internet.

Some embodiments described herein include systems and methods for media privacy. For example, a content capture system (e.g., smartphone) may capture a picture of one or more individuals, and store the picture locally on the content capture system. The content capture system may provide the picture to a content processing server that recognizes at least some of the individuals in the picture, and determines whether to distort a representation of the recognized individuals based on associated privacy preferences. For example, the content processing system may blur the face of one individual, but not the others, based on their respective privacy preferences. The content processing system may provide the distorted picture to the content capture system, and the content capture system may replace the original picture with the distorted picture.

In various embodiments, a system comprises a picture and associated metadata, the picture and the associated metadata captured by a content capture system. A recognizable characteristic datastore may be configured to store a plurality of recognizable characteristics, each of the plurality of recognizable characteristics associated with a different user. A location identification module may be configured to identify a location based on the associated metadata, and identify a set of potential target systems within a predetermined range of the location. A characteristic recognition module may be configured to compare a set of recognizable characteristics of the plurality of recognizable characteristics with the picture, each recognizable characteristic of the set of recognizable characteristics associated with a different potential target user of a corresponding potential target system, and determine whether the picture includes one or more representations of at least one actual target user of the potential target users based on the comparison. A distortion module may be configured to distort a feature of each of the one or more representations of the least one actual target user in response to the determination, and a communication module may be configured to provide the distorted picture to the first content capture system.

In some embodiments, at least a portion of the plurality of recognizable characteristics comprises a set of images. In some embodiments, at least a portion of the plurality of recognizable characteristics comprises one or more features derived from a set of images. In some embodiments, the feature comprises one or more facial features. In some embodiments, at least a portion of the plurality of recognizable characteristics comprises a wearable item.

In some embodiments, the location comprises a time and location.

In some embodiments, the system further comprises a profile generation module configured to determine distortion preferences for the at least one actual target user, wherein the distortion module configured to distort the feature comprises the distortion module configured to distort the feature based on the distortion preferences.

In some embodiments, the distortion module configured to distort the feature comprises the distortion module configured to blur the feature.

In various embodiments, a method comprises receiving a picture and associated metadata, the picture and the associated metadata captured by a content capture system. A plurality of recognizable characteristics may be stored, each of the plurality of recognizable characteristics associated with a different user. A location may be identified based on the associated metadata. A set of potential target systems may be identified within a predetermined range of the location. A set of recognizable characteristics of the plurality of recognizable characteristics may be compared with the picture, each recognizable characteristic of the set of recognizable characteristics associated with a different potential target user of a corresponding potential target system. The method may further comprise determining whether the picture includes one or more representations of at least one actual target user of the potential target users based on the comparison. A feature of each of the one or more representations of the least one actual target user may be distorted in response to the determination. The distorted picture may be provided to the first content capture system.

In some embodiments, at least a portion of the plurality of recognizable characteristics comprises a set of images. In some embodiments, at least a portion of the plurality of recognizable characteristics comprises one or more features derived from a set of images. In some embodiments, the feature comprises one or more facial features. In some embodiments, at least a portion of the plurality of recognizable characteristics comprises a wearable item.

In some embodiments, the location comprises a time and location.

In some embodiments, the method further comprises determining distortion preferences for the at least one actual target user, wherein the distorting the feature comprises the distorting the feature based on the distortion preferences.

In some embodiments, the distorting the feature comprises blurring the feature.

In various embodiments, a non-transitory computer readable medium comprises executable instructions, the instructions being executable by a processor to perform a method, the method comprising receiving a picture and associated metadata, the picture and the associated metadata captured by a content capture system. A plurality of recognizable characteristics may be stored, each of the plurality of recognizable characteristics associated with a different user. A location may be identified based on the associated metadata. A set of potential target systems may be identified within a predetermined range of the location. A set of recognizable characteristics of the plurality of recognizable characteristics may be compared with the picture, each recognizable characteristic of the set of recognizable characteristics associated with a different potential target user of a corresponding potential target system. The method may further comprise determining whether the picture includes one or more representations of at least one actual target user of the potential target users based on the comparison. A feature of each of the one or more representations of the least one actual target user may be distorted in response to the determination. The distorted picture may be provided to the first content capture system.

DETAILED DESCRIPTION

The Internet has provided platforms (e.g., Facebook, Instagram, etc.) for posting pictures and other media that are accessible by almost anyone anywhere, which raises a variety of privacy issues. Moreover, digital cameras are becoming more prevalent, as they are now typically included in mobile devices (e.g., smartphones, tablets, smartglasses, etc.), which makes it more difficult for individuals to even be aware that their picture has been taken. Thus, for example, pictures may be taken of an individual and sometimes even posted on a social media system without the individual ever have been made aware that their pictures was taken, let alone publicized on the Internet.

Some embodiments described herein include systems and methods for media privacy. For example, a content capture system (e.g., smartphone) may capture a picture of one or more individuals, and store the picture locally on the content capture system. The content capture system may provide the picture to a content processing server that recognizes at least some of the individuals in the picture, and determines based on user preferences whether to distort a representation of the recognized individuals based on associated privacy preferences. For example, the content processing system may blur the face of one individual, but not the others, based on their respective privacy preferences. The content processing system may provide the distorted picture to the content capture system, so that the content capture system may replace the original picture with the distorted picture. In other embodiments, the content capture system may cooperate with the content processing system to determine whether to distort the representation of the recognized individuals before the picture is posted on a social media website. In other embodiments, the social media system may cooperate with the content processing system to determine whether to distort the representation of the recognized individuals before the picture is posted on a social media website. Other embodiments and applications are also possible.

Figure 1:
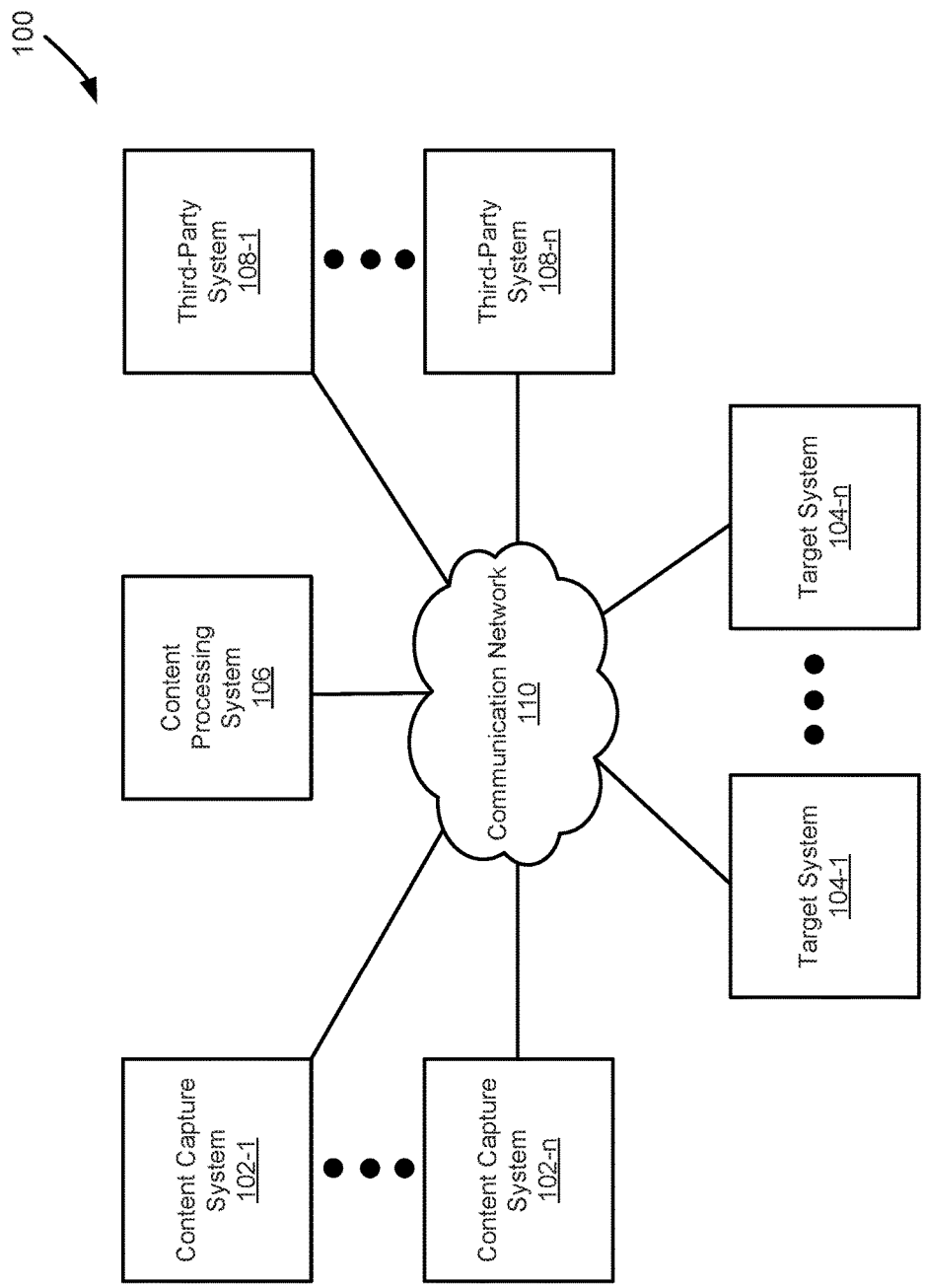
FIG. 1 depicts a block diagram illustrating a content privacy network system according to some embodiments.

FIG. 1 depicts a block diagram illustrating a content privacy network system 100 according to some embodiments. The system 100 includes content capture systems 102-1 to 102-n (individually, the content capture system 102, collectively, the content capture systems 102), target systems 104-1 to 104-n (individually, the target system 104, collectively, the target systems 104), a content processing system 106, third-party systems 108-1 to 108-n (individually, the third-party system 108, collectively, the third-party systems 108), and a communication network 110.

The content capture systems 102 may be configured to capture, store, provide, and receive content items (e.g., pictures, images, video, audio, etc.) and associated metadata (e.g., location information, time information, content capture system 102 information, etc.). For example, the content capture system 102 may capture a picture of one or more targets (e.g., individuals, buildings, structures, etc.) along with a location (e.g., geographic coordinates, street address, city, town, etc.) and a time (e.g., time of day, date, etc.) the picture was captured, and an identifier (e.g., a UID) of the content capture system 102. In some embodiments, functionality of the content capture systems 102 may be performed by one or more mobile devices (e.g., smartphones, cell phones, smartwatches, tablet computers, smartglasses, or the like), cameras, desktop computers, laptop computers, workstations, or the like.

The target systems 104 may be configured to identify time and location information for associated devices and/or users. For example, the associated devices and/or users may include potential and actual target users, as well as their associated devices (e.g., smartphones). In some embodiments, the target systems 104 may provide (e.g., broadcast) location coordinates (e.g., GPS coordinates, Wi-Fi-based coordinates, cellular tower-based coordinates, etc.) at various predetermined intervals (e.g., every 15 seconds, every minute, etc.). In various embodiments, functionality of the target systems 104 may be performed by one or more mobile devices (e.g., smartphones, cell phones, smartwatches, tablet computers, smartglasses, or the like), desktop computers, laptop computers, workstations, or the like. In various embodiments, the target systems 104 include some or all of the functionality of a content capture system 102. Likewise, in some embodiments, the content capture systems 102 may include some or all of the functionality of the target systems 104.

The content processing system 106 may be configured to evaluate the content relative to target user preferences, and to distort, or otherwise modify, content items based on those preferences. For example, the content processing system 106 may distort particular features (e.g., facial features) of individuals captured in a content item, if the preferences of the individuals are set to distort. In some embodiments, functionality of the content processing system 106 may be performed by one or more workstations, desktop computers, laptop computers, mobile devices, or the like.

In some embodiments, the content processing system 106 receives a content item and associated metadata, identifies a set of potential target users that may be represented in the content item (e.g., based on location and time information), identifies a set of actual target users represented in the content item, and, based on privacy preferences of the actual target users, distort their representation within the content item. For example, a particular user's privacy preference may indicate that their face should be blurred, or otherwise anonymized, in all or some pictures (e.g., pictures captured by unknown or untrusted users, captured in particular locations, etc.), but not in other pictures (e.g., pictures captured by known or trusted users, captured in trusted locations, etc.). This system may, for example, improve user privacy by preventing other systems and users from posting pictures of the users or taking other actions on the content without their permission.

As used in this paper, a potential target user may be any user that may potentially be represented within a content item. For example, potential target users may include users within a predetermined distance (e.g., 60 feet) of a location the content item was captured at or within a particular time period of the time the content item was captured. As follows, actual target users may be users selected from the potential target users that are represented within the content item.

In some embodiments, the content processing system 106 identifies actual target users based on recognizable characteristics of potential target users. For example, users may submit several images (e.g., six pictures) of their face captured from several angles. In some embodiments, images are submitted during account registration. The content processing 106 may generate a recognizable characteristic based on the pictures. For example, the recognizable characteristic may be the set of images themselves, a composite image generated from the set of images, or one or more other recognizable characteristics that may be used to identify a user. In some embodiments, the content processing system 106 may use the recognizable characteristics to perform facial recognition on content items to identify actual target users.

The third-party systems 108 may be configured to post (or otherwise publish) content items, including distorted content items. For example, the third-party systems 108 may comprise social media systems (e.g., Facebook, Instagram, Pinterest, Snapchat, etc.), blogs, email systems, instant messaging systems, and the like. In some embodiments, functionality of the third-party systems 108 may be performed by one or more workstations, desktop computers, laptop computers, mobile devices, or the like.

In some embodiments, the communication network 110 represents one or more computer networks (e.g., LAN, WAN, or the like). The communication network 110 may provide communication between any of the content capture systems 102, the target systems 104, the content processing system 106, and the third-party systems 108. In some implementations, the communication network 110 comprises computing devices, routers, cables, buses, and/or other network topologies. In some embodiments, the communications network 110 may be wired and/or wireless. In various embodiments, the communications network 110 may comprise the Internet, one or more networks that may be public, private, IP-based, non-IP based, and so forth.

Figure 2:
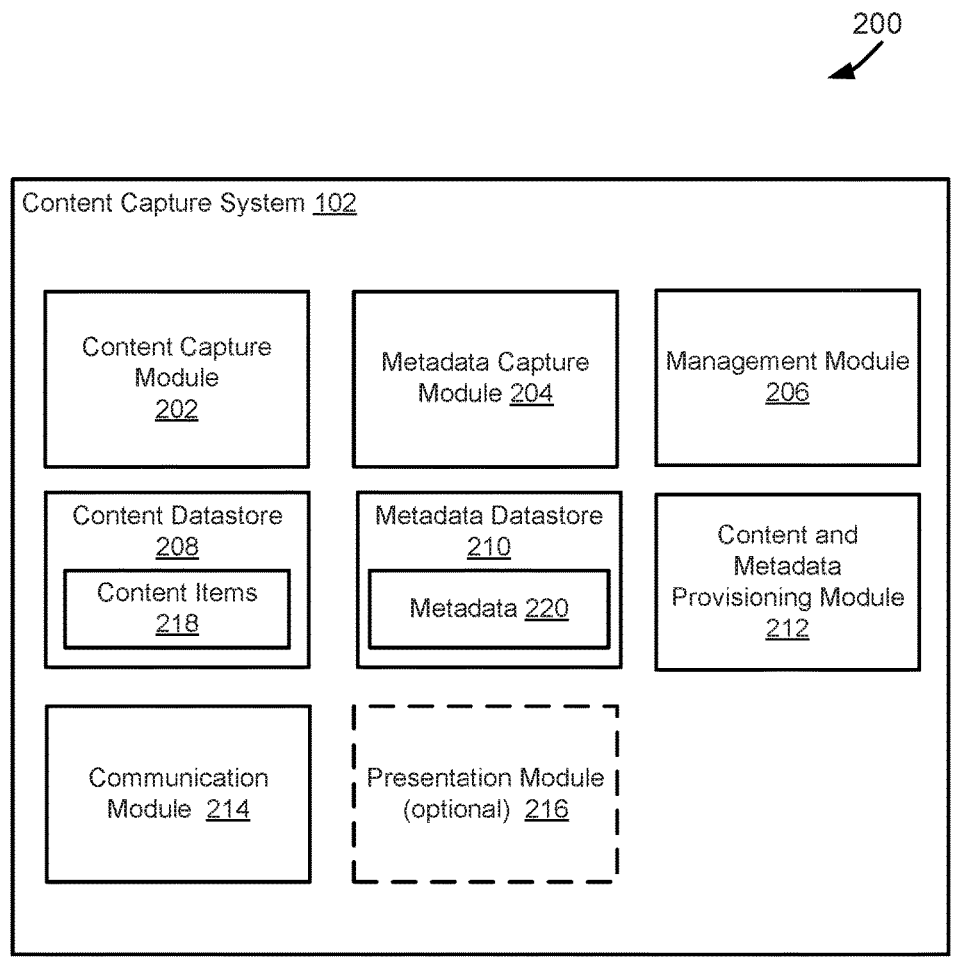
FIG. 2 depicts a block diagram illustrating details of a content capture system according to some embodiments.

FIG. 2 depicts a block diagram 200 illustrating details of a content capture system 102 according to some embodiments. In some embodiments, the content capture system 102 includes a content capture module 202, a metadata capture module 204, a management module 206, a content datastore 208, a metadata datastore 210, a content and metadata provisioning module 212, a communication module 214, and an optional presentation module 216.

The content capture module 202 may be configured to capture content items 218 of one or more targets. For example, the content capture module 202 may utilize one or more sensors (e.g., cameras, microphones, etc.) associated with the content capture system 102 to capture content items 218. In some embodiments, the one or more sensors are included in one or more devices performing the functionality of the content capture system 102, although in other embodiments, it may be otherwise. For example, the one or more sensors may be remote from the content capture system 102 and communicate sensor data (e.g., video, audio, images, pictures, etc.) to the content capture system 102 via the network 110.

The metadata capture module 204 may be configured to capture metadata 220 associated with content items 218. For example, the metadata 220 may include a location the content item 218 was captured, a time the content item 218 was captured, an identifier of the content capture system 102 that captured the content item 218, and/or the like. In some embodiments, the metadata 220 may include an action request (e.g., upload content item 218 to a third-party system 108). In some embodiments, the metadata 220 may be used to identify potentials targets, actual targets, determine whether to distort particular features within a content item 218, and so forth.

The management module 206 may be configured to manage (e.g., create, read, update, delete, or otherwise access) content items 218 stored at least temporarily in the content datastore 208, and metadata 220 stored at least temporarily in the metadata datastore 210. The management module 206 may perform any of these operations manually (e.g., by a user interacting with a GUI), automatically (e.g., triggered by one or more of the modules 212-214), or both. In some embodiments, the management module 206 comprises a library of executable instructions which are executable by a processor for performing any of the aforementioned management operations. The datastores 208-210 may be any structure and/or structures suitable for storing the content items 218 and the metadata 220. For example, the datastores 208-210, as well as some or all of the datastores described herein, may comprise a cache, a buffer, a relational database, an active database, a self-referential database, a table, a matrix, an array, a flat file, a documented-oriented storage system, a non-relational No-SQL system, and the like.

In some embodiments, the content items 218 include data of captured content. For example, the data may correspond to pictures files, video files, audio files, and/or the like. In some embodiments, the data may comprise a compressed format (e.g., JPEG) and/or a raw format.

In some embodiments, the metadata 220 may include a variety of data, attributes, and values associated with a content item 218. In some embodiments, the metadata 220 may be included within an associated content item 218. In some embodiments, the metadata 220 may include some or all of the following data:

Content Item Identifier: an identifier of an associated content item 218.

Content Capture System Identifier: an identifier (e.g., UID) of the content capture system 102 that captured the associated content item 218.

User Identifier: an identifier (e.g., UID) of a user of the content capture system 102 that captured the associated content item 218.

Content Item Type: identifies a content type of the content item 218, e.g., picture, video, audio, etc.

Location: a location where the associated content item 218 was captured.

Time: a time (e.g., timestamp) the associated content item 218 was captured.

Action(s): one or more content item actions (or, "actions") associated with the content item 218. For example, actions may include storing the content item 218 on the content capture system 102, uploading the content item 218 to a third-party system 108, and the like.

The content and metadata provisioning module 212 may be configured to provide content items 218 and associated metadata 220. For example, the module 212 may package a set of one or more content items 218 and associated metadata 220, and transmit the package over a network (e.g., network 110) to one or more other systems (e.g., the content processing system 106, social media system 108, etc.).

The communication module 214 may be configured to send requests, receive requests, and/or otherwise provide communication with one or a plurality of systems. In some embodiments, the communication module 214 may be configured to encrypt and decrypt communications. The communication module 214 may send requests to and receive data from a system through a network or a portion of a network. Depending upon implementation-specific or other considerations, the communication module 214 may send requests and receive data through a connection, all or a portion of which may be a wireless connection. The communication module 214 may request and receive messages, and/or other communications from associated systems.

The presentation module 216 may be configured to present content items 218, present metadata 220, present a viewer to facilitate capturing content items 218, receive user input, search for particular content items 218 and metadata 220, and the like. In some embodiments, the presentation module 216 may include a web browser interface or a mobile application interface.

Figure 3:
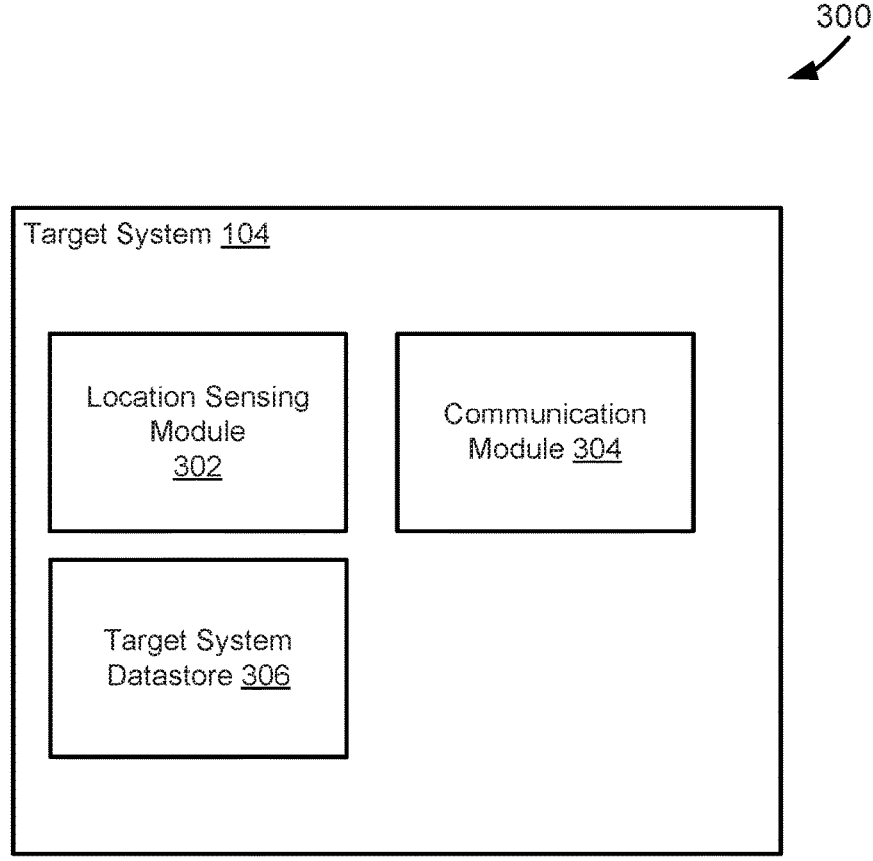
FIG. 3 depicts a block diagram illustrating details of a target system according to some embodiments.

FIG. 3 depicts a block diagram 300 illustrating details of a target system 104 according to some embodiments. In some embodiments, the target system 104 include a location sensing module 302, a communication module 304, and a target system datastore 306.

The location sensing module 302 may be configured to determine a geographic location of the target system 104. For example, location information may be used to identify a set of potential target users, and a set of actual target users. In some embodiments, the location sensing module 304 may be implemented using GPS, Wi-Fi signals, and/or cellular signals.

The communication module 304 may be configured to send requests, receive requests, and/or otherwise provide communication with one or a plurality of systems. In some embodiments, the communication module 304 may be configured to encrypt and decrypt communications. The communication module 304 may send requests to and receive data from a system through a network or a portion of a network. Depending upon implementation-specific or other considerations, the communication module 304 may send requests and receive data through a connection, all or a portion of which may be a wireless connection. The communication module 304 may request and receive messages, and/or other communications from associated systems. Received data may be stored in the datastore 306.

The communication module 304 may also be configured to send location and/or time information to the content processing system 106 on a periodic basis, in response to trigger events, based on clock information, based on change of location, and/or the like.

In some embodiments, the target systems 104 include some or all of the functionality of the content capture systems 102, e.g., a presentation module, a content capture module, and the like.

Figure 4:
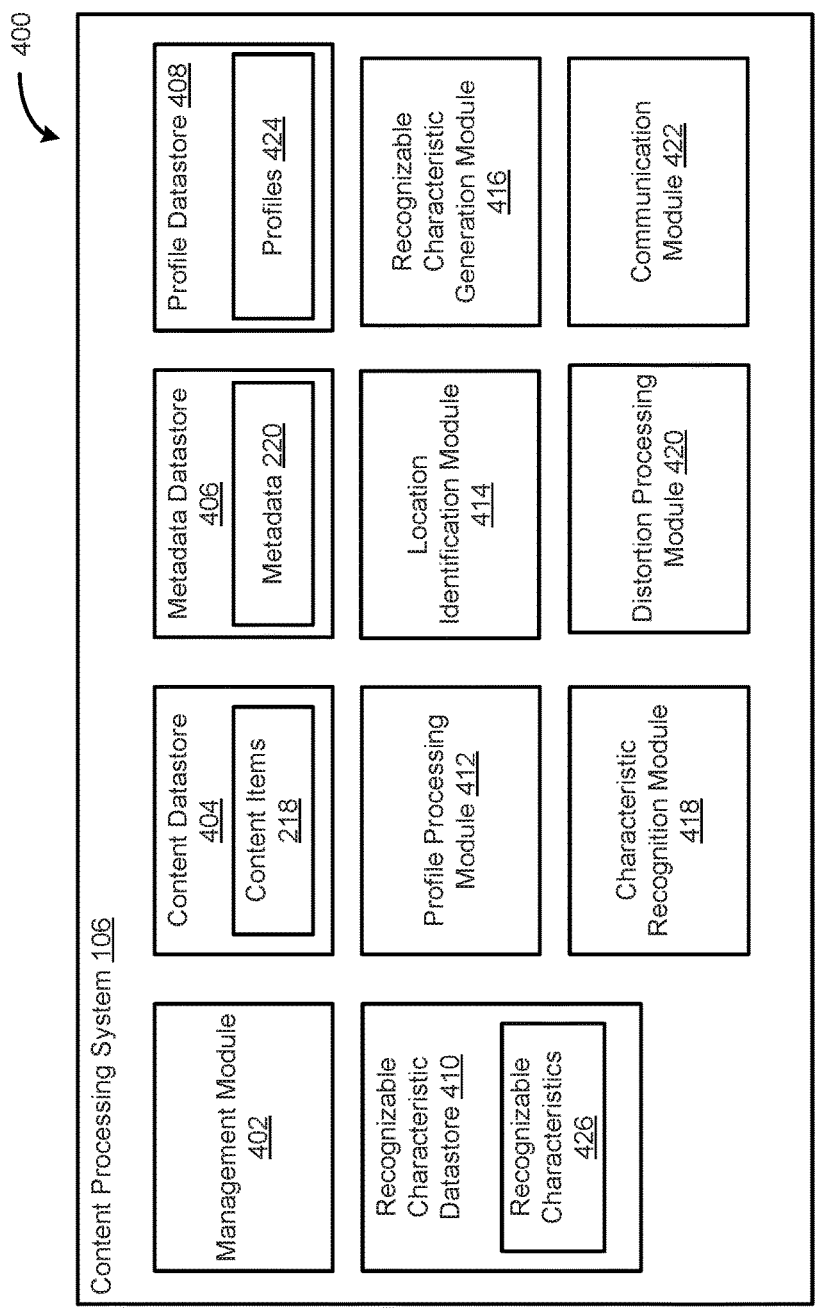
FIG. 4 depicts a block diagram illustrating details of a content processing system according to some embodiments.

FIG. 4 depicts a block diagram 400 illustrating details of a content processing system 106 according to some embodiments. In some embodiments, the content processing system 106 includes a management module 402, a content datastore 404, a metadata datastore 406, a profile datastore 408, a recognizable characteristic datastore 410, a profile generation module 412, a location identification module 414, a recognizable characteristic generation module 418, a characteristic recognition module 418, a distortion processing module 420, and a communication module 422.

The management module 402 may be configured to manage (e.g., create, read, update, delete, or otherwise access) content items 218 stored at least temporarily in the content datastore 404, metadata 220 stored at least temporarily in the metadata datastore 406, profiles 422 stored in the profile datastore 408, and recognizable characteristics 424 stored in the recognizable characteristic datastore 410. The management module 402 may perform any of these operations manually (e.g., by an administrator interacting with a GUI), automatically (e.g., triggered by one or more of the modules 412-422), or both. In some embodiments, the management module 402 comprises a library of executable instructions which are executable by a processor for performing any of the aforementioned management operations. The datastores 404-410 may be any structure and/or structures suitable for storing the content items 218, the metadata 220, the profiles 422, and recognizable characteristics 424.

In some embodiments, the content items 218 and metadata 220 may only be stored temporarily by the content processing system 106, e.g., to protect the privacy of associated users. For example, the content items 218 and metadata 220 may only be stored long enough to perform the processing described herein (e.g., content item distortion, provision to one or more other systems, etc.), after which, the content items 218 and metadata 220 may be deleted.

As mentioned above, in some embodiments, the content items 218 may include data of captured content. Also as mentioned above, in some embodiments, the metadata 220 may include a variety of data, attributes, and values associated with a content item 218. In some embodiments, the metadata 220 may be included within an associated content item 218. In some embodiments, the metadata 220 may include some or all of the following data: a content item identifier, a content capture system identifier, a user identifier, a content item type, a location, a time, action(s), and the like.

In some embodiments, the profiles 424 may include a variety of data, attributes, and values associated with user profiles. For example, profiles 424 may be used to determine whether some, none, or all of the user representations within a content item are distorted. In some embodiments, the profiles 424 may include some or all of the following data:

- Profile Identifier: an identifier (e.g., UID) of the stored profile 424.
- Content Capture System Identifier: identifier(s) of one or more content capture systems 102 associated the stored profile 424.
- User Identifier: an identifier of a user associated with the stored profile 424.
- Time and Location: historical and current times (e.g., timestamp) and geographic locations (e.g., GPS coordinates) of the associated target system 104. For example, times and locations may be updated every 15 seconds, or at other predetermined intervals.
- Privacy Preferences: user-defined and/or default privacy preferences to determine whether and/or how to distort a user's representation in a content item 218. In some embodiments, the privacy preferences may be associated with particular actions, e.g., allow someone to take picture and store on phone, but require distortion if the image is being published. In some embodiments, the privacy preferences include a list or other structure (collectively, a list) of trusted users, and one or more actions permitted or not permitted for the trusted users. For example, if a target user's representation is captured by a content capture system 102 of a trusted user, the privacy preferences may indicate that the content item 218 may be stored and uploaded, stored but not uploaded, or the like.

Similarly, in some embodiments, the privacy preferences include a list of untrusted users, and one or more actions permitted or not permitted for the untrusted users. For example, if a target user's representation is captured by a content capture system 102 of an untrusted user, the privacy preferences may indicate that the content item 218 may not be stored nor uploaded.

In some embodiments, the privacy preferences include a list of trusted locations, and one or more actions permitted or not permitted for the trusted locations. For example, if a target user's representation is captured by a content capture system 102 within a range (e.g., 25 m) of a trusted location, the privacy preferences may indicate that the content item 218 may be stored and uploaded, stored but not uploaded, or the like.

Similarly, in some embodiments, the privacy preferences include a list of untrusted locations, and one or more actions permitted or not permitted for the untrusted locations. For example, if a target user's representation is captured by a content capture system 102 within a range (e.g., 25 m) of an untrusted location, the privacy preferences may indicate that the content item 218 may not be stored nor uploaded.

In some embodiments, the privacy preferences include a list of trusted times, and one or more actions permitted or not permitted for the trusted times. For example, if a target user's representation is captured by a content capture system 102 within an amount of time (e.g., 30 m) of a trusted time (e.g., 6:00 PM), the privacy preferences may indicate that the content item 218 may be stored and uploaded, stored but not uploaded, or the like.

Similarly, in some embodiments, the privacy preferences include a list of untrusted times, and one or more actions permitted or not permitted for the untrusted times. For example, if a target user's representation is captured by a content capture system 102 within an amount of time (e.g., 30 m) of an untrusted time (e.g., 1:00 AM), the privacy preferences may indicate that the content item 218 may, the privacy preferences may indicate that the content item 218 may not be stored nor uploaded.

In some embodiments, some or all privacy preferences may be enabled or disabled, e.g., toggled between "on" or "off." For example, a particular privacy preference, e.g., a untrusted location preference, may be turned off, thereby allowing content capture systems 102 to store and/or provide content items including their representation without distortion, which would otherwise not be allowed if the untrusted location preference was turned on.

In some embodiments, the recognizable characteristics 426 may include a variety of data, attributes, and values. For example, user profiles may be used to determine whether some, none, or all of the user representations within a content item are distorted. In some embodiments, the recognizable characteristics 426 may include some or all of the following data:

- Recognizable Characteristic Identifier: identifies the stored recognizable characteristics 426.
- Recognizable Characteristic: the recognizable characteristic. For example, a set of images of the associated user, a composite image, or other data that may be used to identify a representation of the associated user within a content item 218.
- Profile: identifies an associated profile 424.

The profile generation module 412 may be configured to generate profiles 424. In some embodiments, profiles may be generated during a user account registration process. For example, the profile generation module 412 may collect user provided information (e.g., privacy preferences) and system provided information (e.g., content capture system identifier, etc.). In some embodiments, the profile generation module 412 may be configured to update profiles 424. For example, profiles 424 may updated to include a new locations and times, different privacy preferences, and so forth.

The location identification module 414 may be configured to determine a location of users and/or systems that capture content items 218, and users and/or systems that are the target of content capture systems 102. For example, the location identification module 414 may interpret metadata 220 to identify a location of a content capture system 102 and a time the content item 218 was captured, and also identify a set of potential targets within a range of the content capture system 102 at the time content item 218 was captured. In some embodiments, the location identification module 414 may be configured to identify the set of potential targets by retrieving selected profiles 424 having a time and location with a range of the time and location indicated in the associated metadata 220, and generate a set of user identifiers and/or target system 104 identifiers from the selected profiles 424.

In some embodiments, the location identification module 414 determines location through one or more positioning techniques. For example, the location identification module 414 may determine the location through GPS tracking of the devices associated with content capture systems 102 and target systems 104. In some embodiments, the location identification module 414 may determine location based on Wi-Fi and/or cellular signals sent to and received from the devices associated with the content capture systems 102 and target systems 104.

The recognizable characteristics generation module 416 may be configured to generate recognizable characteristics 426 for an individual. The recognizable characteristics 426 may be any characteristics through which an individual may be identified or associated. In being associated with an individual, a characteristic may allow for an individual to be identified out of a group of individuals. For example, the recognizable characteristics 426 may be a wearable item, such as an article of clothing, a pair of sun-glasses, or an emblem. In some embodiments, the recognizable characteristics 426 are characteristics that are determined through facial recognition techniques. For example, the recognizable characteristics 426 may be the shape of the face, the eyes, the nose, or the chin of an individual. The facial recognition techniques may include techniques for converting a three dimensional profile of an individual contained within an image to a two dimensional profile, from which recognizable characteristics 426 may be determined.

The recognizable characteristics generation module 416 may be configured to generate recognizable characteristics 426 from images that are received from the individual or a person or user associated with the individual. The images can be received from the target system 104. In one example, the recognizable characteristics generation module 416 may determine the characteristics from six images that are received from the target system 104. The six images may include, for example, a close image (e.g., 2 feet or less from the individual) of the face and profiles of the individual, a far range (e.g., 10 feet or more from the individual) of the face and profiles of the individual, and so forth.

The recognizable characteristics generation module 416 may be configured to associate the recognizable characteristics 426 of an individual with an identifier that represents the individual and/or a target system 104 or content capture system 102 that the individual uses. In associating the recognizable characteristics 426 of an individual with an identifier that represents the individual, the recognizable characteristics generation module 416 may generate or modify a data structure uniquely representing the individual to include the identifier and the recognizable characteristics 426. Additionally, the recognizable characteristics generation module 416 may generate or modify an individual's data structure to include the images that were used to determine the recognizable characteristics 426. The data structure representing the individual may be stored in the recognizable characteristics datastore 410.

The characteristic recognition module 418 may be configured to determine whether a representation of a potential target user is included within a content item 218. For example, the characteristic recognition module 418 may compare the recognizable characteristic 426 of each potential target users with the content item 218, and flag any matches as actual target users. In some embodiments, the characteristic recognition module 418 determines whether or not content items 218 contain recognizable characteristics 426 of a potential target user represented by the data structure stored in the recognizable characteristics datastore 410 that includes the recognizable characteristics 426.

In some embodiments, the characteristics recognition module 418 may perform image processing on the content item 218 to determine whether recognizable characteristics 426 are present in the content item 218. For example, the characteristics recognition module 418 may convert the content item 218 to gray scale wherein each pixel is represented by a single intensity value. The characteristics recognition module 410 may determine whether a recognizable characteristic 426 is present in the content item 218, for example, through pixel matching. For example, the characteristics recognition module 418 may determine whether or not the pixels that make up the recognizable characteristic 426 are present in the same order as in the recognizable characteristic 426 in the content item 218. The characteristics recognition module 418 may use a minimum threshold to determine whether a recognizable characteristic 426 is present in the content item 218 through pixel matching. For example, if the characteristics recognition module 418 determines that a specific number of pixels, e.g. seventy five percent, of the recognizable characteristic 426 is found in the content item 218 in the order that they exist in the recognizable characteristic 426, then the characteristics recognition module 418 may determine that the recognizable characteristic 426 is present in the content item 218.

The distortion processing module 420 may be configured to evaluate whether to distort a content item 218 and to distort at least a portion (e.g., a feature of a representation of user within the content item 218) of the content item 218 if the characteristics recognition module 418 determines the content item 218 contains a recognizable characteristic 426 of a potential target user, and if the privacy preferences of the recognized target user indicates it should be distorted. In distorting a content item 218, the distortion processing module 420 may use the privacy preferences of the actual target users (i.e., the subset of users of the set of potential users that included within the content item 218). For example, the distortion processing module 420 may blur, or otherwise obscure, the face or other feature of the representation of the actual target user.

Additionally, the distortion processing module 420 may be configured to only distort the content item 218 if certain conditions specified in the privacy preferences are met. For example, if the privacy preferences indicate to only distort the content item 218 if a user is trying to post the content item 218 to a third-party system 108, the distortion processing module 420 may only distort the content item 218 if a user attempts to post the content item 218 a third-party system 108.

As indicated above, the distortion processing module 420 may blur features of actual target user representations in a content item 218. For example, the distortion processing module 420 may apply a Gaussian blurring function to the specific pixels in the content item 218 that form the representation of the actual target user or any other feature through which the target user may be identified. In some embodiments, the distortion processing module 420 may continue to apply a Gaussian blurring function to the specific pixels in the content item 218 until the representation of the actual target user or any other features through which the actual target user may be identified are no longer recognizable in the content item 218.

The communication module 422 may be configured to provide and receive content items 218 (distorted and/or undistorted), send requests, receive requests, and/or otherwise provide communication with one or a plurality of systems. In some embodiments, the communication module 422 may be configured to encrypt and decrypt communications. The communication module 422 may send requests to and receive data from a system through a network or a portion of a network. Depending upon implementation-specific or other considerations, the communication module 422 may send requests and receive data through a connection, all or a portion of which may be a wireless connection. The communication module 422 may request and receive messages, and/or other communications from associated systems.

Figure 5:
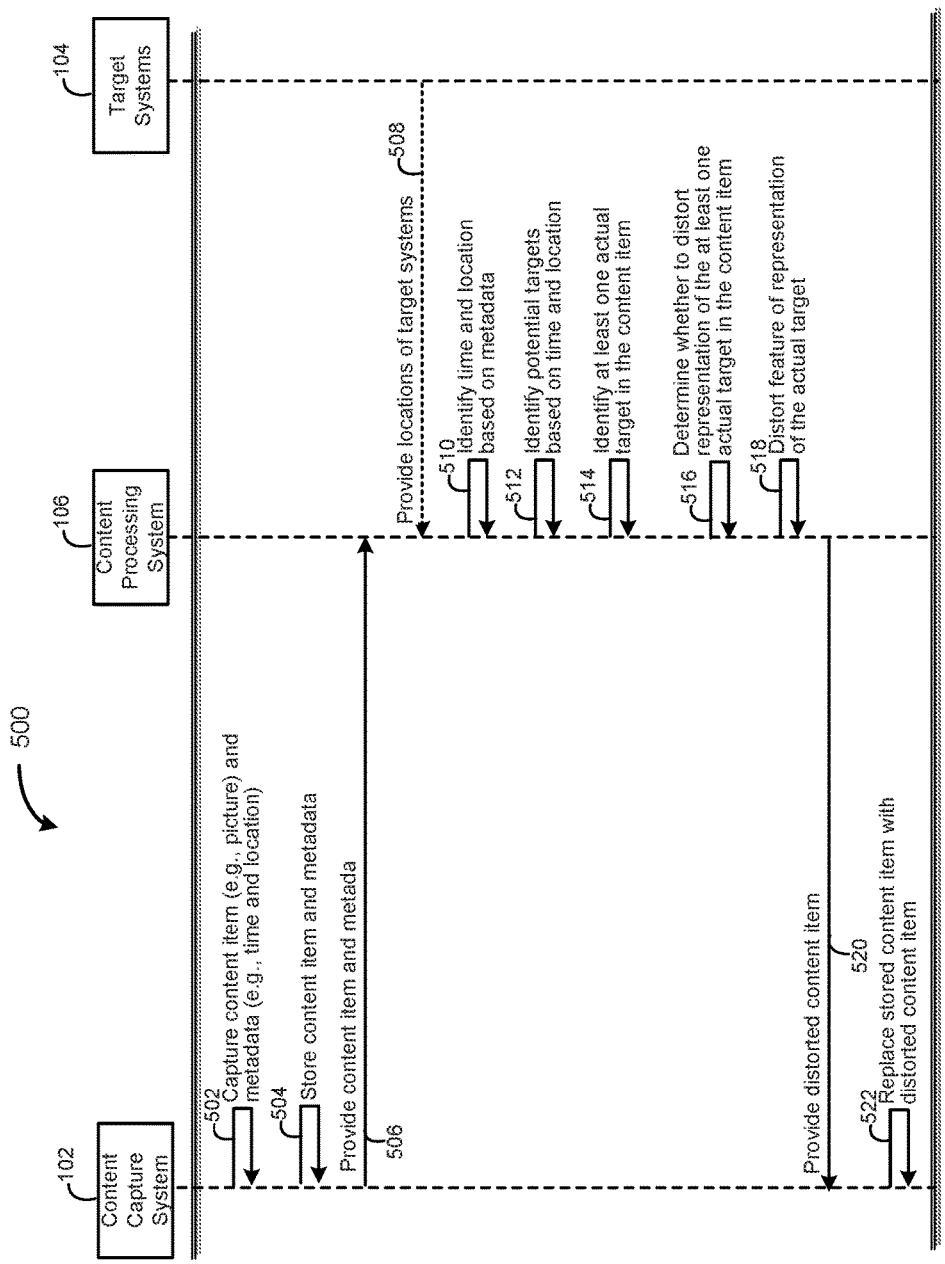
FIG. 5 depicts a flowchart illustrating a method of distorting a content item according to some embodiments.

FIG. 5 depicts a flowchart 500 illustrating a method of distorting a content item 218 (e.g., a picture) according to some embodiments. In this and other flowcharts, the flowchart shows by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 502, a content capture module 202 of a content capture system 102 captures a content item 218 and associated metadata 220. For example, a content capture system 102 may capture a picture of one or more individuals, and capture a time and location the picture was taken.

In step 504, a management module 206 of the content capture system 102 stores the content item 218 in a content datastore 208, and stores the metadata 220 in a metadata datastore 210.

In step 506, a content and metadata provisioning module 212 of the content capture system 102 provides the content item 218 and associated metadata 220 to a content processing system 106. For example, the content and metadata provisioning module 212 may provide the content item 218 and metadata 220 in response to a particular action (e.g., storing the content item 218 on the content capture system 102). In some embodiments, a communication module 422 of the content processing system 106 may receive the content item 218 and metadata 220 over a network 110.

In step 508, communication module(s) 306 of one or more targets systems 104 provide current location(s) for the one or more target systems 104. In some embodiments, location sensing modules 302 of the one or more target system 104 determine the current location(s). It will be appreciated that this step, as with other steps, may be performed multiple times and/or at different points of the method. For example, this step may be performed at predetermined intervals (e.g., every 15 seconds). In some embodiments, the target systems 104 may broadcast the locations at various predetermined intervals, and/or provide the location in response to a request from the content processing system 106.

In step 510, a location identification module 414 of the content processing system 106 identifies a time and location based on the associated metadata 220. For example, the location identification module 414 may perform the determination based on timestamp data and GPS coordinate data included in the metadata 220.

In step 512, the location identification module 414 of the content processing system 106 identifies a set of potential target users within a predetermined range of the location. For example, the location identification module 414 may retrieve selected profiles 424 of five different potential target users that have a time and location within a predetermined range of the time and location included in the metadata 220.

In step 514, a characteristic recognition module 418 of the content processing system 106 identifies at least one actual target user in the content item 218. In some embodiments, the characteristic recognition module 418 compares recognizable characteristics 426 of the potential target users with representations of the individuals within the content item 218. For example, the potential target users having a recognizable characteristic 426 matching a representation in the content item 218 may be flagged as actual target users.

In step 516, a distortion module 420 of the content processing system 106 determines whether to distort at least a portion of the content item 218. For example, the characteristic recognition module 418 may recognize three actual target users from the set of potential target users. The distortion module 420 may individually determine based on corresponding privacy preferences whether to distort the representations of the actual target users within the content item 218. For example, distortion module 420 may indicate the face of the representation of a first actual target user may be distorted based on the privacy preferences of the first actual target user, while the remaining representations of the other actual target users may not be distorted based on the preferences of the second and third actual target users.

In step 518, the distortion module 420 of the content processing system 106 distorts a feature of each of the one or more representations of the least one actual target user based on the determination. Continuing the example above, the distortion module 420 may blur the face of the first actual target user, while the representations of the of the other actual target users remain in their original form.

In step 520, a communication module 422 of the content processing system 106 provides the distorted content item 218 to the content capture system 102. In some embodiments, a communication module 214 of the content capture system 102 receives the distorted content item 218 over the network 110.

In step 522, the management module 206 of the content capture system 102 replaces the corresponding non-distorted content item 218 with the distorted content item 218.

Figure 6:
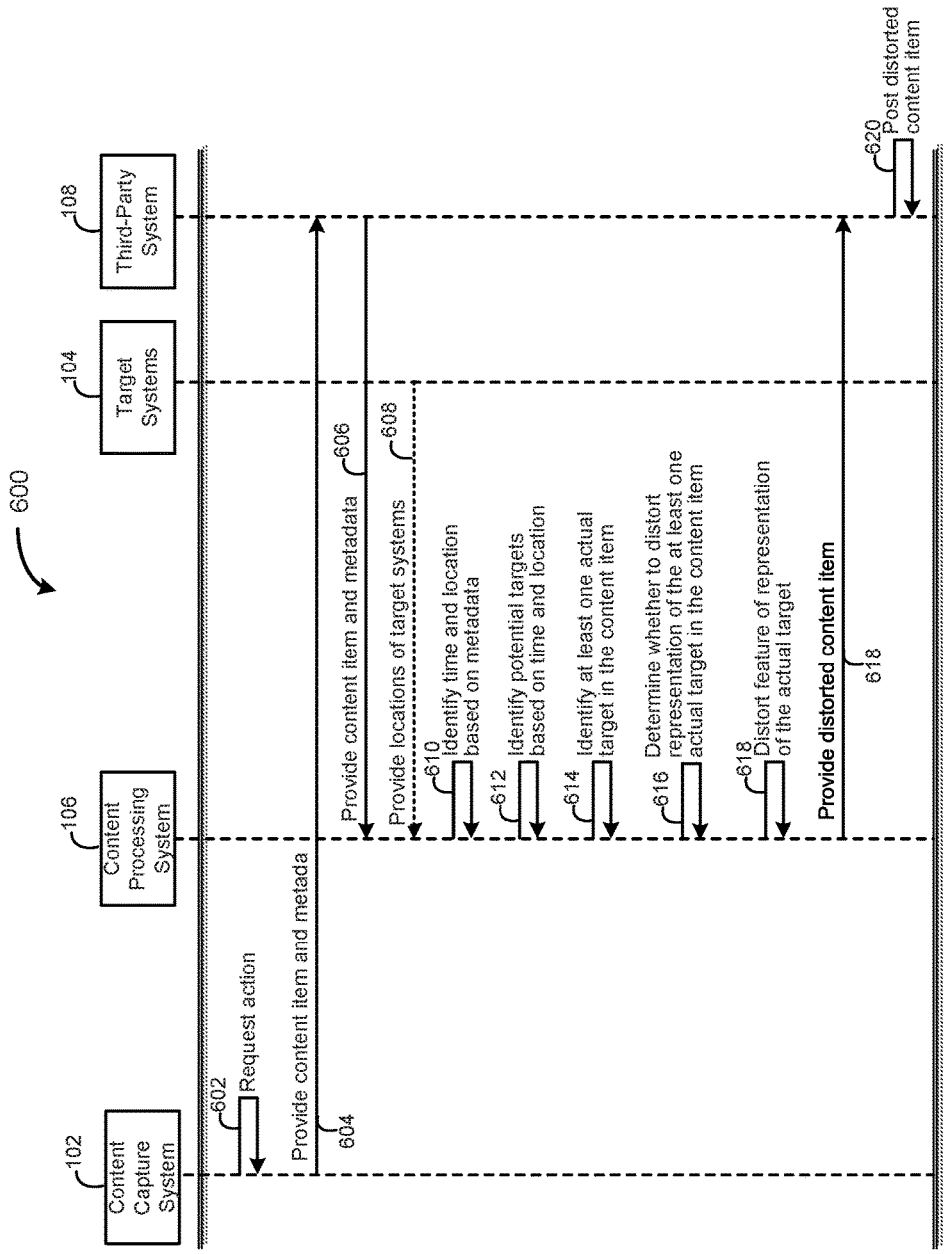
FIG. 6 depicts a flowchart illustrating a method of distorting a content item and posting the distorted content item to a third-party system according to some embodiments.

FIG. 6 depicts a flowchart 600 illustrating a method of distorting a content item (e.g., a picture) and posting the distorted content item 218 to a third-party system 108 (e.g., a social media system) according to some embodiments.

In step 602, a metadata capture module 204 of a content capture system 102 requests a content item action. For example, a content item action may comprise storing a content item 218, uploading a content item 218, and so forth. For the purposes of this example, the content item action request comprises a request to upload a content item 218 to a social media system 108.

In step 604, a content and metadata provisioning module 212 of the content capture system 102 provides the content item 218 and associated metadata 220 to the third-party system 108 indicated by the content item action request. For example, the content item 218 and metadata 220 may be transmitted over a network 110. In some embodiments, the content item action request may be included in the metadata 220.

In step 606, the third-party system 108 provides (or, redirects) the content item 218 and metadata 218 to a content processing server 106.

In step 608, communication module(s) 306 of one or more targets systems 104 provide current location(s) for the one or more target systems 104. In some embodiments, location sensing modules 302 of the one or more target systems 104 determine the locations. It will be appreciated that this step, as with other steps, may be performed multiple times and/or at different points of the method. For example, this step may be performed at predetermined intervals (e.g., every 15 seconds). In some embodiments, the target systems 104 may broadcast their locations at various predetermined intervals, and/or provide their location in response to a request from the content processing system 106.

In step 610, a location identification module 414 of the content processing system 106 identifies a time and location based on the associated metadata 220. For example, the location identification module 414 may perform the determination based on timestamp data and GPS coordinate data included in the metadata 220.

In step 612, the location identification module 414 of the content processing system 106 identifies a set of potential target systems 104 within a predetermined range of the location. For example, the location module 414 may retrieve selected profiles 424 of five different potential target users that have a time and location within a predetermined range of the time and location included in the metadata 220.

In step 614, a characteristic recognition module 418 of the content processing system 106 identifies at least one actual target user in the content item 218. In some embodiments, the characteristic recognition module 418 compares recognizable characteristics 426 of the potential target users with representation of individuals within the content item 218. For example, the potential target users having a recognizable characteristic 426 matching a representation in the content item 218 may be flagged as an actual target user.

In step 616, a distortion module 420 of the content processing system 106 determines whether to distort at least a portion of the content item 218. For example, the characteristic recognition module 418 may recognize three actual target users from the set of potential target users. The distortion module 420 may individually determine based on corresponding privacy preferences whether to distort the representations of the actual target users within the content item 218. For example, the distortion module 420 may indicate the face of the representation of a first actual target user may be distorted based on the privacy preferences of the first actual target user, while the remaining representations may not be distorted based on the preferences of the second and third actual target users.

In step 618, the distortion module 420 of the content processing system 106 distorts a feature of each of the one or more representations of the least one actual target user based on the determination. Continuing the example above, the distortion module 420 may blur the face of the first actual target user, while the representations of the of the other actual target users may remain in their original form.

In step 620, a communication module 422 of the content processing system 106 provides the distorted content item 218 to the third-party system 108. In step 622, the third-party system 108 posts (or, "publishes") the content item 218. For example, the content item 218 may be posted on a Facebook user's wall or timeline.

Figure 7:
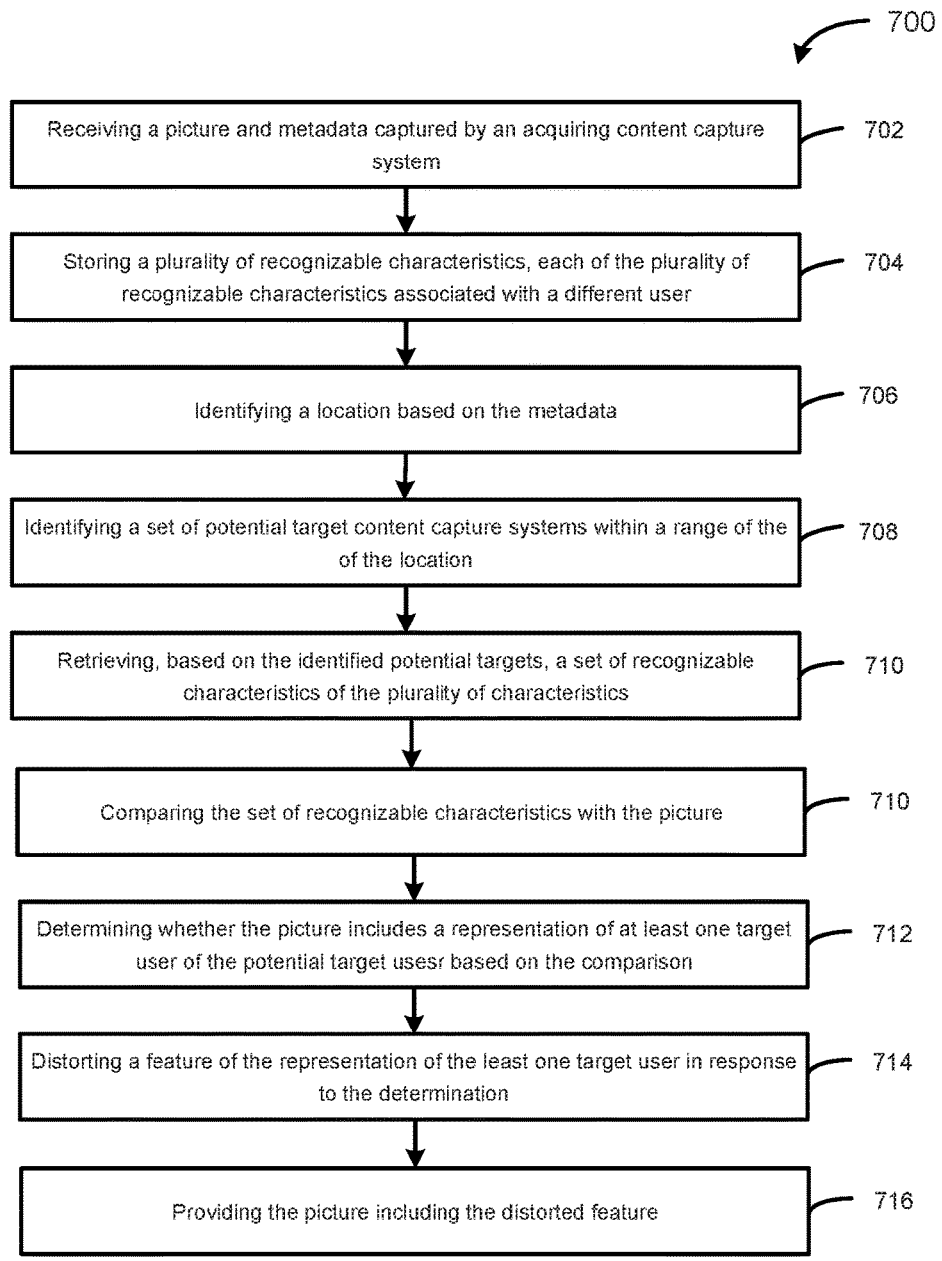
FIG. 7 depicts a flowchart illustrating a method of operation of a content processing system for distorting a content item according to some embodiments.

FIG. 7 depicts a flowchart 700 illustrating a method of operation of a content processing system 106 for distorting a content item 218 according to some embodiments.

In step 702, a communication module 422 receives a picture 218 and associated metadata 220, the picture 218 and the associated metadata 220 captured by a content capture system 102. In step 704, a recognizable characteristic datastore 410 stores a plurality of recognizable characteristics 424, each of the plurality of recognizable characteristics 424 associated with a different user 104. In step 706, a location identification module 414 identifies a location based on the associated metadata 220. In step 708, the location identification module 414 identifies a set of potential target systems 104 within a predetermined range of the location. In step 710, a characteristic recognition module 418 retrieves, based on the identified target systems 104, a set of recognizable characteristics from the recognizable characteristics datastore 410. In step 712, the characteristic recognition module 418 compares the set of recognizable characteristics of the plurality of recognizable characteristics with the picture, each recognizable characteristic of the set of recognizable characteristics associated with a different potential target user of a corresponding potential target system. In step 714, the characteristic recognition module 418 determines whether the picture includes one or more representations of at least one actual target user of the potential target users based on the comparison. In step 716, a distortion module 420 distorts a feature of each of the one or more representations of the least one actual target user in response to the determination. In step 718, a communication module 422 provides the distorted picture to the first content capture system 102

Figure 8:
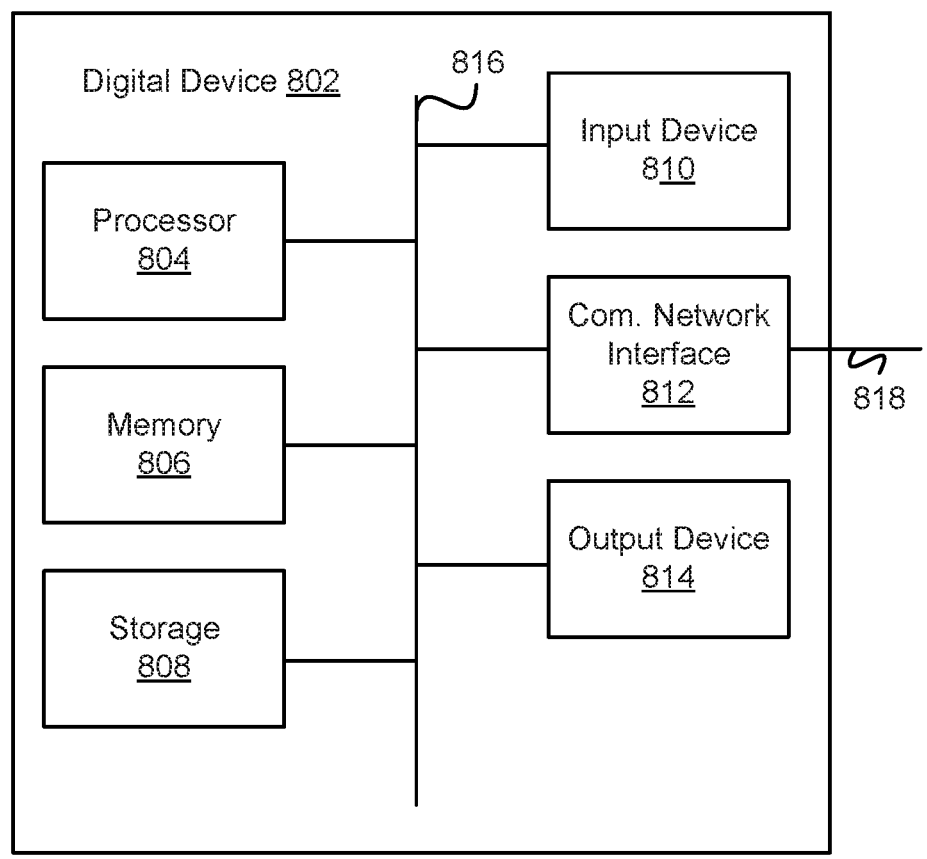
FIG. 8 depicts a block diagram illustrating details of a computing device according to some embodiments.

FIG. 8 depicts a block diagram 800 illustrating details of a computing device 802 according to some embodiments. Any of the content capture systems 102, the target systems 104, the content processing system 106, the third-party systems 108, and the communication network 110 may comprise an instance of the digital device 802. The digital device 802 comprises a processor 804, memory 806, storage 808, an input device 810, a communication network interface 812, and an output device 814 communicatively coupled to a communication channel 816. The processor 804 is configured to execute executable instructions (e.g., programs). In some embodiments, the processor 804 comprises circuitry or any processor capable of processing the executable instructions.

The memory 806 stores data. Some examples of memory 806 include storage devices, such as RAM, ROM, RAM cache, virtual memory, etc. In various embodiments, working data is stored within the memory 806. The data within the memory 806 may be cleared or ultimately transferred to the storage 808.

The storage 808 includes any storage configured to retrieve and store data. Some examples of the storage 808 include flash drives, hard drives, optical drives, and/or magnetic tape. Each of the memory system 806 and the storage system 808 comprises a computer-readable medium, which stores instructions or programs executable by processor 804.

The input device 810 is any device that inputs data (e.g., mouse and keyboard). The output device 814 outputs data (e.g., a speaker or display). It will be appreciated that the storage 808, input device 810, and output device 814 may be optional. For example, the routers/switchers may comprise the processor 804 and memory 806 as well as a device to receive and output data (e.g., the communication network interface 812 and/or the output device 814).

The communication network interface 812 may be coupled to a network (e.g., network 110) via the link 818. The communication network interface 812 may support communication over an Ethernet connection, a serial connection, a parallel connection, and/or an ATA connection. The communication network interface 812 may also support wireless communication (e.g., 802.11 a/b/g/n, WiMax, LTE, WiFi). It will be apparent that the communication network interface 812 may support many wired and wireless standards.

It will be appreciated that the hardware elements of the digital device 802 are not limited to those depicted in FIG. 8. A digital device 802 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 804 and/or a co-processor located on a GPU (i.e., NVidia).

It will be appreciated that a "module," "system," "datastore," and/or "database" may comprise software, hardware, firmware, and/or circuitry. In one example, one or more software programs comprising instructions capable of being executable by a processor may perform one or more of the functions of the modules, datastores, databases, or systems described herein. In another example, circuitry may perform the same or similar functions. Alternative embodiments may comprise more, less, or functionally equivalent modules, systems, datastores, or databases, and still be within the scope of present embodiments. For example, the functionality of the various systems, modules, datastores, and/or databases may be combined or divided differently.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system, comprising:
a picture and associated metadata captured by a content capture system, the associated metadata including a picture time when the picture was taken and a picture location where the picture was taken, the picture possibly including a captured representation of a target object;
a recognizable characteristic datastore configured to store recognizable characteristics of a plurality of target objects, the recognizable characteristics of each respective target object of the plurality of target objects capable of assisting in identifying captured representations of the respective target object in pictures, each respective target object of the plurality of target objects associated with a respective global positioning system;
a datastore configured to store user preferences for each respective target object of the plurality of target objects, the user preferences defining when a respective user associated with the respective target object wishes to distort or wishes not to distort captured representations of the respective target object of the plurality of target objects in pictures;
a location identification module configured to capture a target location of each respective global positioning system associated with each respective target object of the plurality of target objects at a plurality of target times in a day;
a module configured to:
identify from the associated metadata the picture time when the picture was taken and the picture location where the picture was taken, and
evaluate the target locations of each global positioning system associated with each target object of the plurality of target objects to identify any particular global positioning systems that were at or near the picture location at or near the picture time to identify a set of one or more potential target objects of the plurality of target objects that might have been captured in the picture;
a characteristic recognition module configured to:
retrieve the recognizable characteristics of each potential target object of the set of one or more potential target objects,
evaluate the picture to try to identify any captured representation of any potential target object of the set of one or more potential target objects that were captured in the picture, by searching the picture for the recognizable characteristics of each potential target object of the set of one or more potential target objects, and
define each potential target object of the set of one or more potential target objects that were identified to have been captured in the picture as an actual target object;
a distortion module configured to:
retrieve the user preferences for any actual target object,
determine whether the user preferences for any actual target object indicate a wish to distort at least a portion of the captured representation of the actual target object in the picture, and
in response to the user preferences, initiate a process to distort the at least a portion of the captured representation of the actual target object to generate a distorted picture; and
a communication module configured to communicate at least a portion of the distorted picture to a computer network.

2. The system of claim 1, wherein at least one of the recognizable characteristics comprises one or more images.

3. The system of claim 1, wherein at least one of the recognizable characteristics is derived from one or more images.

4. The system of claim 1, wherein at least one of the recognizable characteristics comprises a wearable item.

5. The system of claim 1, wherein the communication module is further configured to communicate the at least a portion of the distorted picture to the content capture system.

6. The system of claim 1, wherein the at least a portion of the captured representation that is distorted comprises one or more features.

7. The system of claim 1, further comprising a profile generation module configured to determine distortion preferences for a respective user associated with the actual target object, wherein the distortion module configured to distort the at least a portion of the captured representation comprises the distortion module configured to distort the at least a portion of the captured representation based on the distortion preferences.

8. The system of claim 1, wherein the distortion module configured to distort the at least a portion of the captured representation comprises the distortion module configured to blur the at least a portion of the captured representation.

9. A method, comprising:
receiving a picture and associated metadata, the picture and the associated metadata captured by a content capture system, the associated metadata including a picture time when the picture was taken and a picture location where the picture was taken, the picture possibly including a captured representation of a target object;
storing recognizable characteristics for a plurality of target objects, the recognizable characteristics of each respective target object of the plurality of target objects capable of assisting in identifying captured representations of the respective target object in pictures, each respective target object of the plurality of target objects associated with a respective global positioning system;
storing user preferences for each respective target object of the plurality of target objects, the user preferences defining when a respective user associated with the respective target object wishes to distort or wishes not to distort captured representations of the respective target object of the plurality of target objects in pictures;

capturing a target location of each respective global positioning system associated with each respective target object of the plurality of target objects at a plurality of target times in a day;

identifying from the associated metadata the picture time when the picture was taken and the picture location where the picture was taken;

evaluating the target locations of each global positioning system associated with each target object of the plurality of target objects to identify any particular global positioning systems that were at or near the picture location at or near the picture time to identify a set of one or more potential target objects of the plurality of target objects that might have been captured in the picture;

retrieving the recognizable characteristics for each potential target object of the set of one or more potential target objects;

evaluating the picture to try to identify any captured representation of any potential target object of the set of one or more potential target objects that were captured in the picture, by searching the picture for the recognizable characteristics of each potential target object of the set of one or more potential target objects;

defining each potential target object of the set of one or more potential target objects that were identified to have been captured in the picture as an actual target object;

retrieving the user preferences for any actual target object;

determining whether the user preferences for any actual target object indicate a wish to distort at least a portion of the captured representation of the actual target object in the picture;

in response to the user preferences, initiating a process to distort the at least a portion of the captured representation of the actual target object to generate a distorted picture; and providing at least a portion of the distorted picture to a computer network.

10. The method of claim 9, wherein at least one of the recognizable characteristics comprises one or more images.

11. The method of claim 9, wherein at least one of the recognizable characteristics is derived from one or more images.

12. The method of claim 9, wherein at least one of the recognizable characteristics comprises a wearable item.

13. The method of claim 9, further comprising providing the at least a portion of the distorted picture to the content capture system.

14. The method of claim 9, wherein the at least a portion of the captured representation that is distorted comprises one or more features.

15. The method of claim 9, further comprising determining distortion preferences for a respective user associated with the actual target object, wherein the distorting the at least a portion of the captured representation comprises distorting the at least a portion of the captured representation based on the distortion preferences.

16. The method of claim 9, wherein the distorting the at least a portion of the captured representation comprises blurring the at least a portion of the captured representation.

17. A system, comprising:

means for receiving a picture and associated metadata, the picture and the associated metadata captured by a content capture system, the associated metadata including a picture time when the picture was taken and a picture location where the picture was taken, the picture possibly including a captured representation of a target object;

means for storing recognizable characteristics for a plurality of target objects, the recognizable characteristics of each respective target object of the plurality of target objects capable of assisting in identifying captured representations of the respective target object in pictures, each respective target object of the plurality of target objects associated with a respective global positioning system;

means for storing user preferences for each respective target object of the plurality of target objects, the user preferences defining when a respective user associated with the respective target object of the plurality of target objects wishes to distort or wishes not to distort captured representations of the respective target object of the plurality of target objects in pictures;

means for capturing a target location of each respective global positioning system associated with each respective target object of the plurality of target objects at a plurality of target times in a day;

means for identifying from the associated metadata the picture time when the picture was taken and the picture location where the picture was taken;

means for evaluating the target locations of each respective global positioning system associated with each respective target object of the plurality of target objects to identify any particular global positioning systems that were at or near the picture location at or near the picture time to identify a set of one or more potential target objects of the plurality of target objects that might have been captured in the picture;

means for retrieving the recognizable characteristics of each potential target object of the set of one or more potential target objects;

means for evaluating the picture to try to identify any captured representation of any potential target object of the set of one or more potential target objects that were captured in the picture, by searching the picture for the recognizable characteristics of each potential target object of the set of one or more potential target objects;

means for defining each potential target object of the set of one or more potential target objects that were identified to have been captured in the picture as an actual target object;

means for retrieving the user preferences for any actual target object;

means for determining whether the user preferences for any actual target object indicate a wish to distort at least a portion of the captured representation of the actual target object in the picture;

means for, in response to the user preferences, initiating a process to distort the at least a portion the captured representation of the actual target object to generate a distorted picture; and means for providing the at least a portion of the distorted picture to a computer network.

18. A non-transitory computer readable medium comprising executable instructions, the instructions being executable by a processor to perform a method, the method comprising:

receiving a picture and associated metadata, the picture and the associated metadata captured by a content capture system, the associated metadata including a picture time when the picture was taken and a picture location where the picture was taken, the picture possibly including a captured representation of a target object;

storing recognizable characteristics for a plurality of target objects, the recognizable characteristics of each respective target object of the plurality of target objects capable of assisting in identifying captured representations of the respective target object in pictures, each respective target object of the plurality of target objects associated with a respective global positioning system;

storing user preferences for each respective target object of the plurality of target objects, the user preferences defining when a respective user associated with a respective target object wishes to distort or wishes not to distort captured representations of the respective target object of the plurality of target objects in pictures;

capturing a target location of each respective global positioning system associated with each respective target object of the plurality of target objects at a plurality of target times in a day;

identifying from the associated metadata the picture time when the picture was taken and the picture location where the picture was taken;

evaluating the target locations of each respective global positioning system associated with each respective target object of the plurality of target objects to identify any particular global positioning systems that were at or near the picture location at or near the picture time to identify a set of one or more potential target objects of the plurality of target objects that might have been captured in the picture;

retrieving the recognizable characteristics of each potential target object of the set of one or more potential target objects;

evaluating the picture to try to identify any captured representation of any potential target object of the set of one or more potential target objects that were captured in the picture, by searching the picture for the recognizable characteristics of each potential target object of the set of one or more potential target objects;

defining each potential target object of the set of one or more potential target objects that were identified to have been captured in the picture as an actual target object;

retrieving the user preferences for any actual target object;

determining whether the user preferences for any actual target object indicate a wish to distort at least a portion of the captured representation of the actual target object in the picture;

in response to the user preferences, initiating a process to distort the at least a portion of the captured representation of the actual target object to generate a distorted picture; and providing at least a portion of the distorted picture to a computer network.

\* \* \* \* \*